United States Patent
Shimonosono et al.

(10) Patent No.: US 6,964,820 B2
(45) Date of Patent: Nov. 15, 2005

(54) WATER RECIRCULATION IN FUEL CELL POWER PLANT

(75) Inventors: Hitoshi Shimonosono, Yokoama (JP); Takashi Hashimoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 590 days.

(21) Appl. No.: 10/155,122

(22) Filed: May 28, 2002

(65) Prior Publication Data
US 2002/0177022 A1 Nov. 28, 2002

(30) Foreign Application Priority Data
May 28, 2001 (JP) ............................. 2001-159333

(51) Int. Cl.$^7$ .............................................. H01M 8/04
(52) U.S. Cl. ......................... 429/17; 429/19; 429/20; 429/22; 429/24; 429/25; 429/26
(58) Field of Search ............................. 429/19, 20, 22, 429/24, 25, 26, 13, 17

(56) References Cited

U.S. PATENT DOCUMENTS

| | | | |
|---|---|---|---|
| 5,985,474 A * | 11/1999 | Chen et al. ................ | 429/17 |
| 6,303,244 B1 * | 10/2001 | Surampudi et al. .......... | 429/17 |
| 6,383,672 B1 * | 5/2002 | Fujita ........................ | 429/26 |
| 2003/0162063 A1 * | 8/2003 | Yoshizawa et al. ......... | 429/24 |

FOREIGN PATENT DOCUMENTS

| | | |
|---|---|---|
| EP | 0 823 743 | 2/1998 |
| JP | 62-264567 | 11/1987 |
| JP | 7-245097 | 9/1995 |
| JP | 11-214025 | 8/1999 |
| JP | 2000-173638 | 6/2000 |
| WO | WO 00/74163 | 12/2000 |
| WO | WO 01/31726 | 5/2001 |

* cited by examiner

*Primary Examiner*—Bruce F. Bell
(74) *Attorney, Agent, or Firm*—McDermott Will & Emery LLP

(57) ABSTRACT

A water pump (4) recirculates water from a water tank (3) in a heat exchanger (2) and a fuel cell stack (1) of a fuel cell power plant via a recirculation passage (5) A water temperature sensor (13) detects a water temperature in the recirculation passage (5). When the water temperature is lower than a predetermined temperature, a controller (16) recirculates water to the water recirculation passage (5) by operating a water pump (4) in order to prevent freezing of water. It is preferred that a heater (15) is provided to heat the water recirculating in the recirculation passage (5).

8 Claims, 8 Drawing Sheets

WATER RECIRCULATION IN FUEL CELL POWER PLANT

FIELD OF THE INVENTION

This invention relates to the prevention of freezing in a water recirculation system provided in a fuel cell power plant.

BACKGROUND OF THE INVENTION

Tokkai Hei 2000-173638 published by the Japanese Patent Office in 2000 discloses a water recirculation system for heating and cooling of a fuel cell stack in a fuel cell power plant. The recirculation system is provided with a water passage passing through a fuel cell stack, a pump that causes the recirculation of water in the water passage and a heater heating the water recirculating in the water passage.

SUMMARY OF THE INVENTION

There is the possibility of water freezing in the passage in cold conditions when fuel cell power plant is not operated.

Tokkai Hei 7-245097 published by the Japanese Patent Office in 1995 discloses a water replenishing device for a rechargeable battery. This device pumps water from an external source in order to replenish water lost from the battery due to vaporization. This device should be regarded as an analogous art rather than a prior art.

According to this analogous art, freezing of water in the pump is prevented by operating the pump at such a low speed that the pump would not discharge the water, when the temperature becomes low. This is in order to prevent damage to the pump as a result of water freezing in the pump at low temperatures.

The supply passage in the water replenishing device for water transferred to the pump and the battery is empty when the pump is not in operation. Consequently the prevention of freezing is limited to water in the pump. Furthermore the device is conspicuously small when compared to the water recirculation device of a fuel cell power plant.

Thus the freezing prevention technique disclosed in Tokkai Hei 7-245097 has no application to prevention of freezing of water in the water passage even if it were applied to prevention of freezing in the water recirculation passage of the fuel cell power plant.

It is therefore an object of this invention to ensure a freezing prevention technique for a water recirculation passage for a fuel cell power plant.

In order to achieve the above object, this invention provides a water recirculation device for such a fuel cell power that is provided with a fuel cell stack and a heat exchanger. The device comprises a water tank, a recirculation passage connecting the fuel cell stack, the heat exchanger and the water tank, a water pump recirculating water in the recirculation passage, a water temperature sensor detecting a water temperature of the recirculation passage, and a programmable controller programmed to recirculate water in the recirculation passage by operating the water pump when the water temperature is less than a predetermined temperature.

This invention also provides a control method for water recirculation in such a fuel cell power plant that is provided with a fuel cell stack, a heat exchanger, a water tank, a recirculation passage connecting the fuel cell stack, the heat exchanger and the water tank, and a water pump recirculating water in the recirculation passage. The method comprises detecting a water temperature of the recirculation passage; and recirculating water in the recirculation passage by operating the water pump when the water temperature is less than a predetermined temperature.

The details as well as other features and advantages of this invention are set forth in the remainder of the specification and are shown in the accompanying drawings.

DESCRIPTION OF THE PREFERRED EMBODIMENTS

Figure 1:
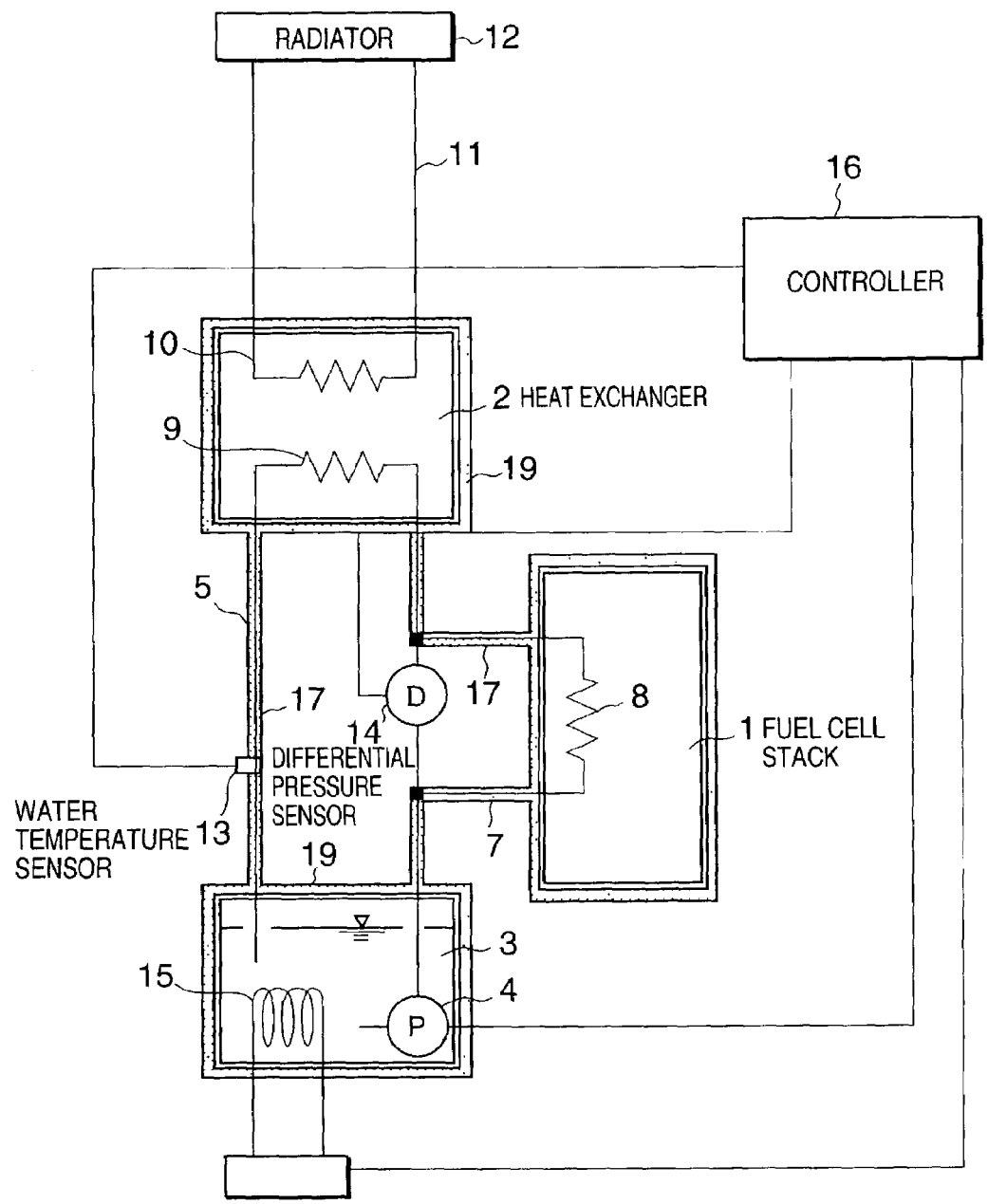
FIG. 1 is a schematic diagram of a water recirculation device for a fuel cell power plant according to this invention.

Referring to FIG. 1 of the drawings, a water recirculation device for a fuel cell power plant according to this invention comprises a cooling water passage 8 formed in a fuel cell stack 1 pressurizes water in the water tank 3 and supplies the pressurized water to the cooling water passage 8 through the inlet pipe 7 of the fuel cell stack 1 from the outer piping 5.

The water passing through the cooling water passage 8 flows into the heat exchanger 2 through the outer piping 5 from the outlet pipe 17 after the temperature is increased by heat exchange with the fuel cell stack 1. A water passage 9 and a cooling medium passage 10 performing heat exchange are formed in the heat exchanger 2. Water flowing from the outer piping 5 to the water passage 9 is cooled by heat exchange with the cooling medium in the cooling medium passage 10 and is recirculated to the water tank 3 from the outer piping 5.

The cooling medium passage 10 of the heat exchanger 2 recirculates a cooling medium through the radiator 12 that is connected to the cooling medium passage via outer piping 11. The cooling medium absorbs heat from the water in the water passage 9 in the heat exchanger 2 and radiates heat in the radiator 12.

The water tank 3 is provided with a heater 15. The water tank 3, the fuel cell stack 1, the heat exchanger 2 and the outer piping 5 connecting these components are all covered by a heat insulation material 19.

The water recirculation device is provided with a programmable controller 16 in order to control operation of the heater 15 and the water pump 4. The controller 16 comprises a microcomputer provided with a central processing unit (CPU), a read only memory (ROM), a random access memory (RAM) and an input/output interface (I/O interface). The controller may comprise a plurality of such microcomputers.

The water recirculation device is provided with a water temperature sensor 13 which detects the water temperature Tw in the outer piping 5 and a differential pressure sensor 14 which detects a differential pressure DP between the inlet pipe 7 and the outlet pipe 17. Detected data from the sensors is input to the controller 16 as signals.

The controller 16 controls the operation of the water pump 4 and the heater 15 in the following manner by outputting respective signals to the heater 15 and the water pump 4 based on the input signal from the water temperature sensor 13 and the differential pressure sensor 14.

While the fuel cell stack 1 is operating, the controller 16 operates the water pump 4 to supply water from the water tank 3 to the cooling water passage 8 of the fuel cell stack 1 The water flown out from the cooling water passage 8 flows into the water tank 3 again after passing through the water passage 9 of the heat exchanger 2.

When the operation of the fuel cell stack 1 is stopped and the water temperature Tw is higher than a rated temperature Tw1, the controller 16 operates the water pump 4 until the water temperature Tw falls to the rated temperature Tw1. Herein, the rated temperature is set at sixty degrees centigrade.

When the water temperature Tw is less than the rated temperature Tw1, the operation of the water pump 4 is stopped. Conversely when the water temperature Tw is not higher than the rated temperature Tw1, the operation of the fuel cell stack 1 and the operation of the water pump 4 are stopped simultaneously.

After stopping the operation of the water pump 4, the controller 16 continues to monitor the water temperature Tw. When the water temperature Tw is less than a freezing protection temperature Tw2, the water pump 4 is again operated. Herein, the freezing protection temperature Tw2 is set at ten degrees centigrade.

Since the water pump 4 is submerged in the water in the water tank 3, water in the water tank 3 is warmed by the heat radiated as a result of the operation of the water pump 4. The water is recirculated through the water cooling passage 8 in the fuel cell stack 1 and the water passage 9 in the heat exchanger 2 due to the operation of the water pump 4. As a result, the water temperature in the passages 8, 9 as well as in the outer piping 5 is increased.

When the external temperature is extremely low, it is sometimes the case that it is not possible to prevent freezing of water by only operating the water pump 4. The viscosity of water increases according to decreases in the water temperature and increases conspicuously near to the freezing point. When the viscosity of water increases while water is recirculated by the operation of the water pump 4, the differential pressure DP between the inlet pipe 7 and the outlet pipe 17 of the fuel cell stack 1 increases.

For this reason, the controller 4 monitors the differential pressure DP detected by the differential pressure sensor 14 during operation of the water pump 4 and activates the heater 15 when the differential pressure DP is greater than a predetermined value DP1. Herein, the predetermined value DP1 is set at fifty kilopascals. In this manner, the water temperature is increased in order to prevent freezing by heating water in the water tank 3 and recirculating the heated water in the passages 8 and 9 as well as in the outer piping 5.

That is to say, the controller 16 prevents freezing of water with a two-step operation comprising a first step of initiating operation of the water pump 4 when the water temperature Tw falls and a second step of operating the heater 15 when the differential pressure DP increases.

Figure 2:
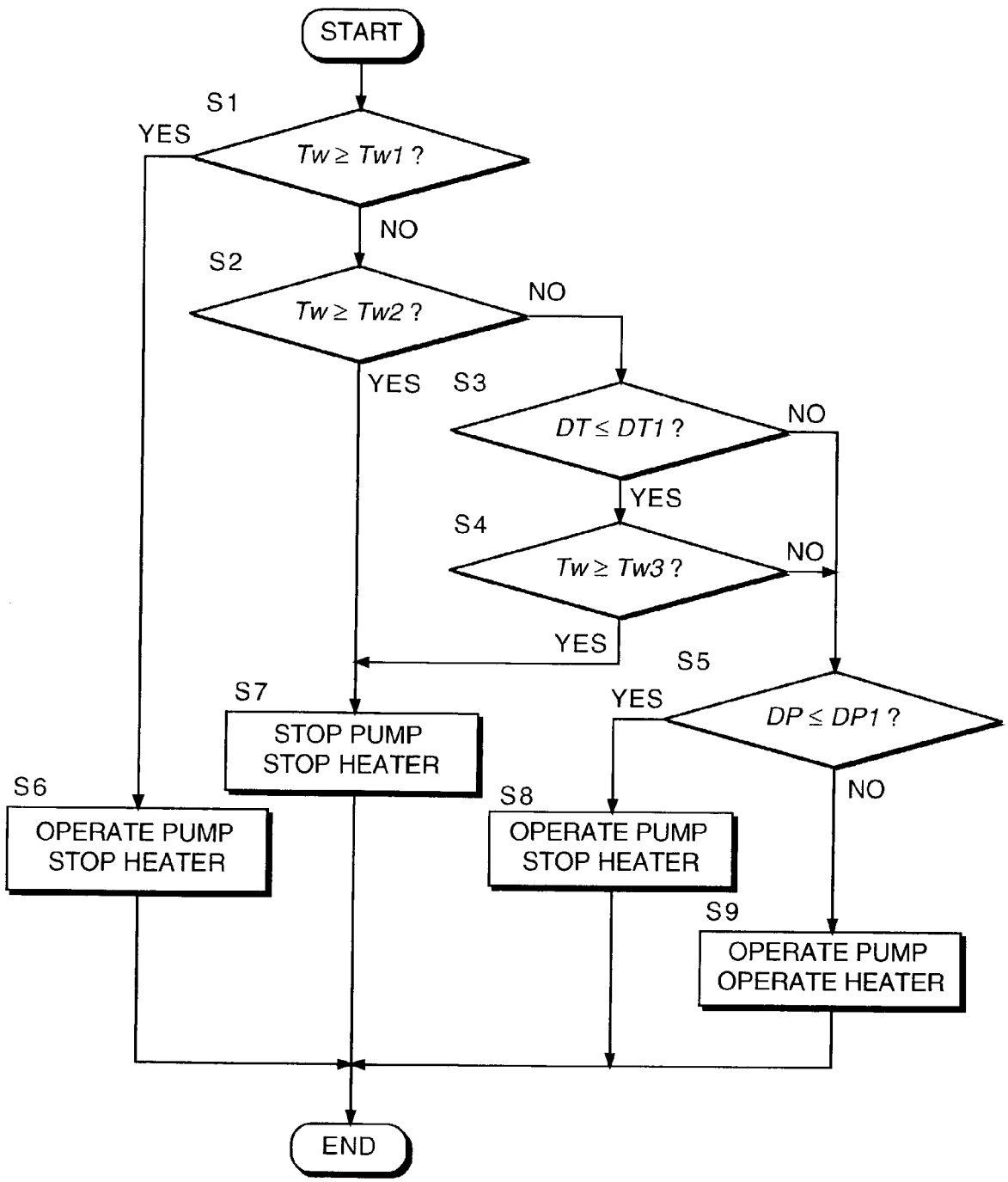
FIG. 2 is a flowchart describing a freezing prevention routine executed by a programmable controller according to this invention.

Referring now to FIG. 2, a freezing prevention routine executed by the controller 16 in order to realize the above control will be described. This routine is repeated at an interval of one second without reference to whether or not the fuel cell stack 1 is operating.

The controller 16 firstly compares the water temperature Tw with the rated temperature Tw1. When the water temperature Tw is not lower than the rated temperature Tw1, in a step S6, the controller 16 outputs an operation signal to the water pump 4 and a stop signal to the heater 15. In reality, the controller 16 controls the discharge amount of water pump 4 in response to the water temperature Tw. However as the control of water temperature during operation of the fuel cell stack 1 is not related to the object of this invention, description of that portion of control is omitted. The controller 16 terminates the routine after the process in the step S6.

In the step S1, when the water temperature Tw is lower than the rated temperature Tw1, the controller 16 compares the water temperature Tw with the freezing protection temperature Tw2 in a step S2.

When the water temperature Tw is greater than the freezing protection temperature Tw2, the controller 16 outputs a stop signal to the water pump 4 and a stop signal to the heater 15 in a step S7. The controller 16 terminates the routine after the process in the step S7.

In the step S2, when the water temperature Tw is lower than the freezing protection temperature Tw2, the controller 16 compares the water temperature reduction rate DT with a predetermined rate DT1 in a step S3.

The water temperature reduction rate DT is expressed as the difference of the water temperature $Tw_{-1}$ used on the immediately previous occasion the routine was executed from the water temperature Tw on the present occasion the routine is executed. The predetermined rate DT1 is set at 0.1 degrees centigrade per minute.

When the water temperature reduction rate DT is larger than the predetermined rate DT1, the controller 16 performs the processing of a step S5. When the water temperature reduction rate DT is not larger than the predetermined rate DT1, the controller 16 compares the water temperature Tw with a freezing determination temperature Tw3 in a step S4. Herein, the freezing determination temperature Tw3 is set at three degrees centigrade.

When the water temperature Tw is not less than the freezing determination temperature Tw3, the controller 16 performs the processing of the aforesaid step S7 and thereafter terminates the routine.

When, on the other hand, the water temperature Tw is lower than the freezing determination temperature Tw3, the controller 16 compares the differential pressure DP detected by the differential pressure sensor 14 with the predetermined value DP1 in the step S5

In the step S5, when the differential pressure DP is greater than the predetermined value DP1, the controller 16 outputs an operation signal to the water pump 4 and an operation signal to the heater 15 in a step S9. The controller 16 terminates the routine after the process in the step S9.

Due to the execution of the above routine, the water pump 4 is first operated when the freezing is anticipated from the water temperature, and then the heater 15 is activated when it is determined that the water is about to freeze. These two-stage operations ensures the protection of the water in the power plant from freezing while suppressing the energy consumption therefor.

Referring to FIGS. 3–8, a second embodiment of this invention will be described.

Figure 3:
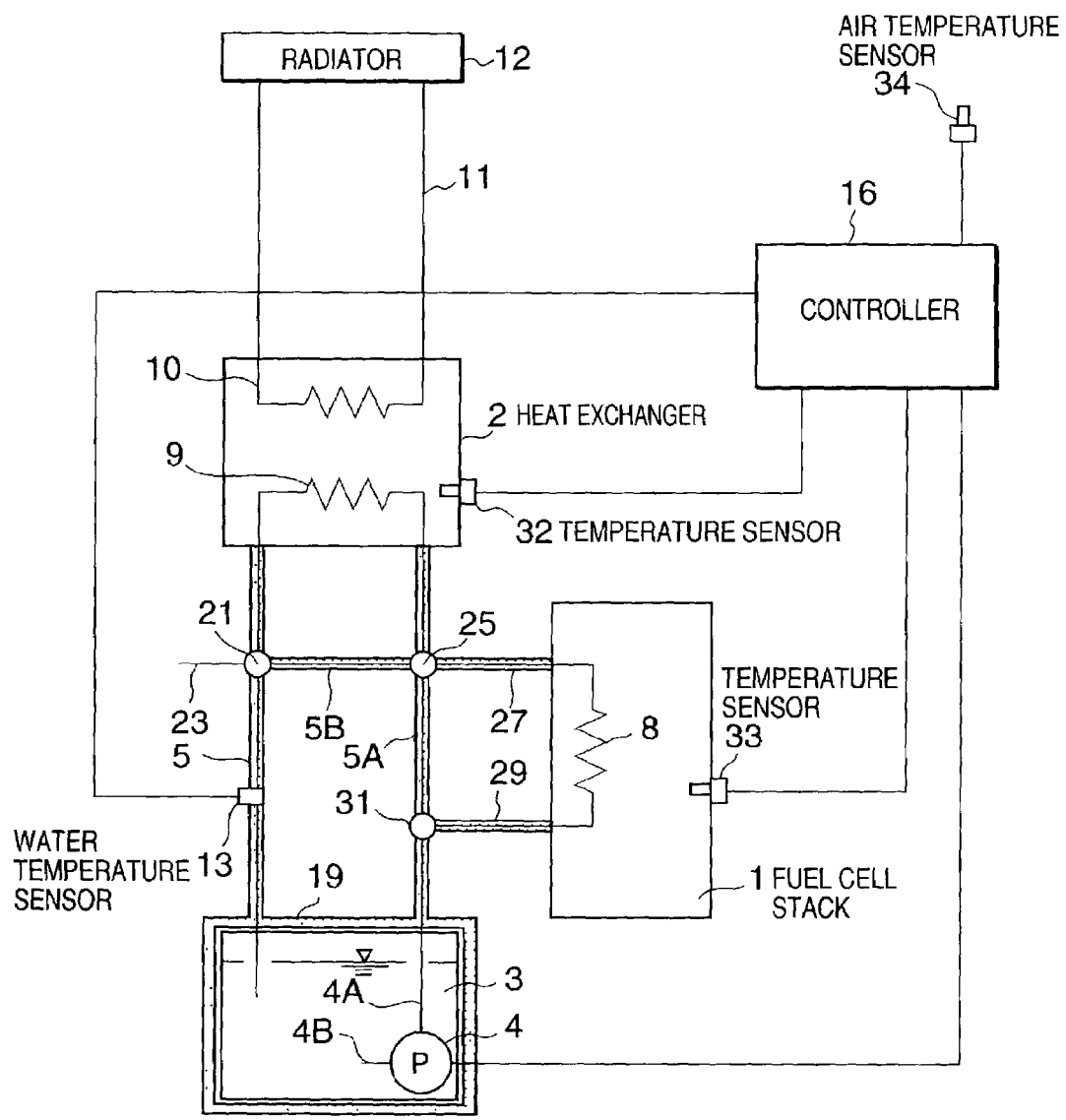
FIG. 3 is similar to FIG. 1, but describing a second embodiment of this invention.

Firstly referring to FIG. 3, in this embodiment, the direction of suction and discharge in the water pump 4 is set in an opposite direction to that in the first embodiment. That is to say, the cooling water passage 8 of the fuel cell stack 1 is connected to a suction port 4A of the water pump 4 through the outer piping 5 and a discharge port 4B of the water pump 4 opens into the water tank 3. A pump which can reverse the suction and discharge direction is used for the water pump 4.

In the description below, the operation of the water pump 4 is designated as "positive" when water is aspirated from the suction port 4A and discharged to the discharge port 4B and is termed "negative" when water is aspirated from the discharge port 4B and discharged to the suction port 4A.

When the water pump 4 is operating in a positive direction, due to the suction force of the water pump 4, the water is sucked from the water tank 3 and recirculates through the water passage 8 and the cooling water passage 9 to the suction port 4A. The water sucked by the water pump 4 is discharged to the discharge port 4B that is open into the water tank 3.

The fuel cell stack 1 is provided with an inlet pipe 27 and an outlet pipe 29 instead of the inlet pipe 7 and the outlet pipe 17 of the first embodiment. The outer piping 5 is provided with a bypass passage 5A which bypasses the cooling water passage 8 in order to directly connect the inlet pipe 27 and the outlet pipe 29 and a bypass passage 5B which bypasses the water passage 9 of the heat exchanger 2.

One end of the bypass passage 5B is connected through a four-way valve 21 to the outer piping 5 near to the inlet of the water passage 9. The four-way valve 21 is provided with a port 23 connected to the outside atmosphere. The four-way valve 21 performs a switching operation in response to input signals from the controller 16 in order to switch between a section connecting the water tank 3 to the water passage 9, a section connecting the water tank 3 to the bypass passage 5B and a section connecting the port 23 to the water passage 9.

The other end of the bypass passage 5B, one end of the bypass passage 5A and the inlet pipe 27 of the fuel cell stack 1 are connected through the four-way valve 25 to the outer piping 5 near to the outlet of the water passage 9 of the heat exchanger 2. The four-way valve 25 performs a switching operation in response to input signals from the controller 16 in order to switch between a section connecting the water passage 9 of the heat exchanger 2 to the inlet pipe 27, a section connecting the bypass passage 5B to the inlet pipe 27 and a section connecting the bypass passage 5B to an end of the bypass passage 5A.

The other end of the bypass passage 5B and the outlet pipe 29 of the fuel cell stack 1 are connected through a three-way valve 31 to the outer piping 5 leading to the suction port 4A of the water pump 4. The three-way valve 31 performs a switching operation in response to input signals from the controller 16 in order to switch between a section connecting the outlet pipe 29 to the suction port 4A of the water pump 4 and a section connecting the bypass passage 5B to the suction port 4A of the water pump 4.

Instead of being provided with the differential pressure sensor 14 of the first embodiment, the water recirculation device is provided with a temperature sensor 32 which detects the temperature Th in the heat exchanger 2, a temperature sensor 33 which detects the temperature Ts in the fuel cell stack 1 and an external air temperature sensor 34 which detects the external air temperature Ta. Signals corresponding to the detected temperature Th from the temperature sensor 32, the detected temperature Ts from the temperature sensor 33 and the detected temperature Ta from the external air temperature sensor 34 are input to the controller 16.

Other aspects of the hardware are the same as those described with reference to the first embodiment.

The controller 16 switches the sections of the four-way valves 21 and 25 and the three-way valve 31 and controls the operation of the water pump 4 based on the water temperature Tw, the detected temperature Th, the temperature Ts of the fuel cell stack 1, the temperature Th of the heat exchanger 2 and the outside air temperature Ta.

This control routine will be described in detail hereafter.

Figure 4:
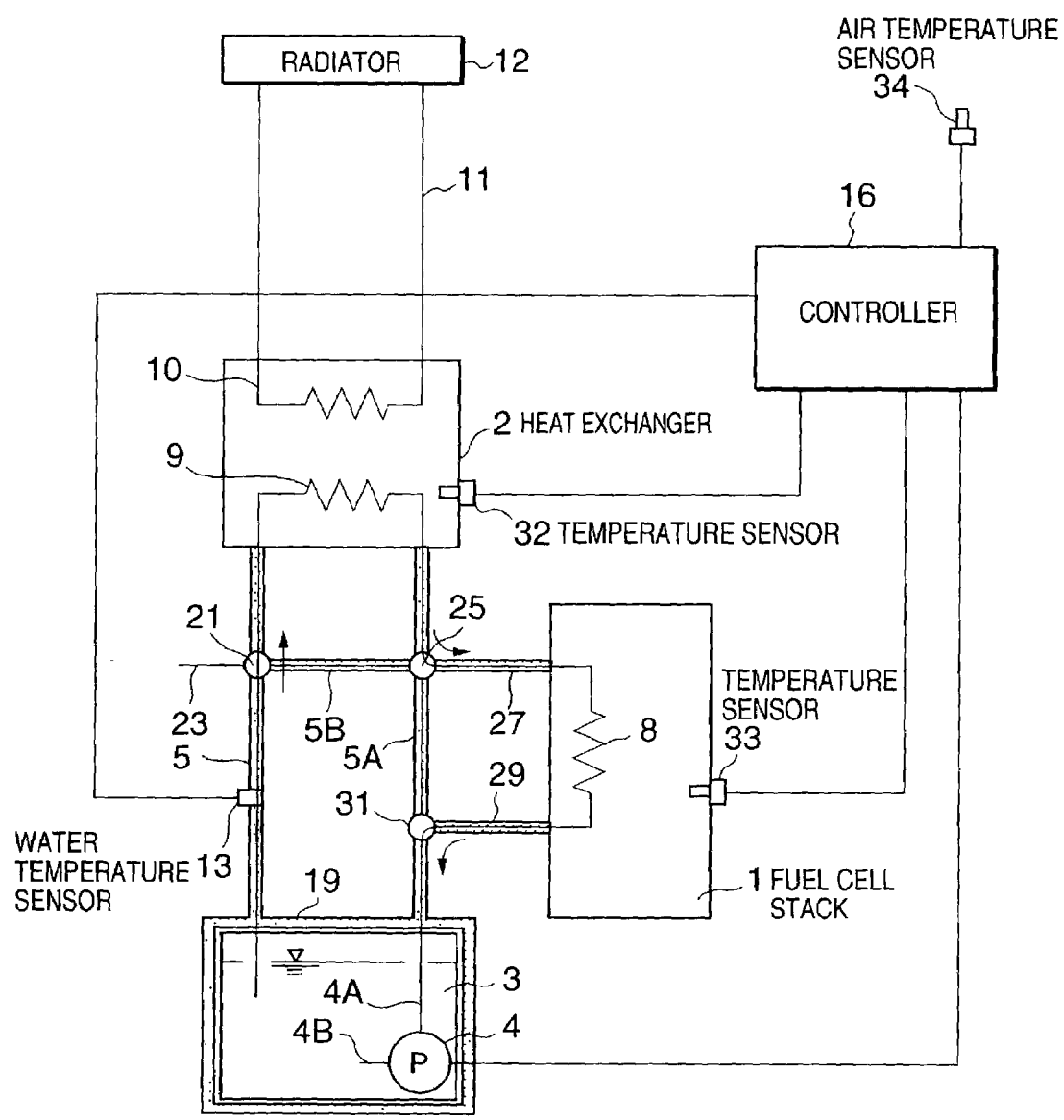
FIG. 4 is a schematic diagram of a water recirculation device according to a second embodiment of this invention showing the flow of water during a normal operation mode.

Referring to FIG. 4, when the fuel cell stack 1 generates power, the controller 16 maintains the four-way valve 21 to the section connecting the water tank 3 to the water passage 9, maintains the four-way valve 25 to the section connecting the water passage 9 to the inlet pipe 27 and maintains the three-way valve 31 to the section connecting the outlet pipe 29 to the suction port 4A of the water pump 4. In the description below, this operating state of the four-way valves 21 and 25 and the three-way valve 31 is referred to as the normal operating mode.

During the normal operating mode, the controller 16 operates the water pump 4 in the positive direction when the detected temperature Ts of the temperature sensor 33 becomes higher than the rated temperature Tw1 during operation. The rated temperature Tw1 is herein set at sixty degrees centigrade as in the case of the first embodiment. The water pump 4 is operated to recirculate water in the water tank 3 through the water passage 9 of the heat exchanger 2 and the cooling water passage 8 of the fuel cell stack 1. As a result, the fuel cell stack 1 is cooled to a temperature range adapted for power generation.

When power generation by the fuel cell stack 1 is stopped, if the water temperature Tw is higher than the rated temperature Tw1, even after the fuel cell stack 1 stops generating power, the controller 16 maintains the normal operating mode and operates the water pump 4 in the positive direction in order to reduce the water temperature Tw to less than the rated temperature Tw1. When the temperature Tw is less than the rated temperature Tw1, the operation of the water pump 4 is stopped.

After power generation by the fuel cell stack 1 is stopped, when the water temperature Tw is less than the rated temperature Tw1 and the outer air temperature Ta is less than the predetermined temperature Ta1, the controller 16 executes the following operation in order to prevent freezing of the water in the power plant. Herein, the predetermined temperature Ta1 is set to a zero degree centigrade.

First as long as the temperature Ts of the fuel cell stack 1 after stopping power generation remains higher than the water temperature Tw as a result of excess heat produced during power generation by the fuel cell stack 1 flowing in the water passage 9.

More precisely, when the temperature Ts of the fuel cell stack 1 is higher than the water temperature Tw by more than ΔTs and when the temperature Th of the heat exchanger 2 is higher than the water temperature Tw by more than ΔTh, the four-way valves 21 and 25 and the three-way valve 31 are respectively maintained at positions corresponding to the normal operating mode as shown in FIG. 4 and the water pump 4 is operated in the positive direction. In this manner, excess heat of the fuel cell stack 1 and the heat exchanger 2 is absorbed by the recirculating water and it is possible to increase the temperature margin in order to prevent freezing of water in the power plant.

On the other hand, when the temperature Ts of the fuel cell stack 1 is higher than the water temperature Tw by more than ΔTs but the temperature difference of the temperature Th of the heat exchanger 2 and the water temperature Tw is less than ΔTh, the possibility exists that heat will not be absorbed by water even when water is recirculated to the heat exchanger 2 and, to the contrary, the heat exchanger 2 may actually reduce the water temperature Tw.

Figure 5:
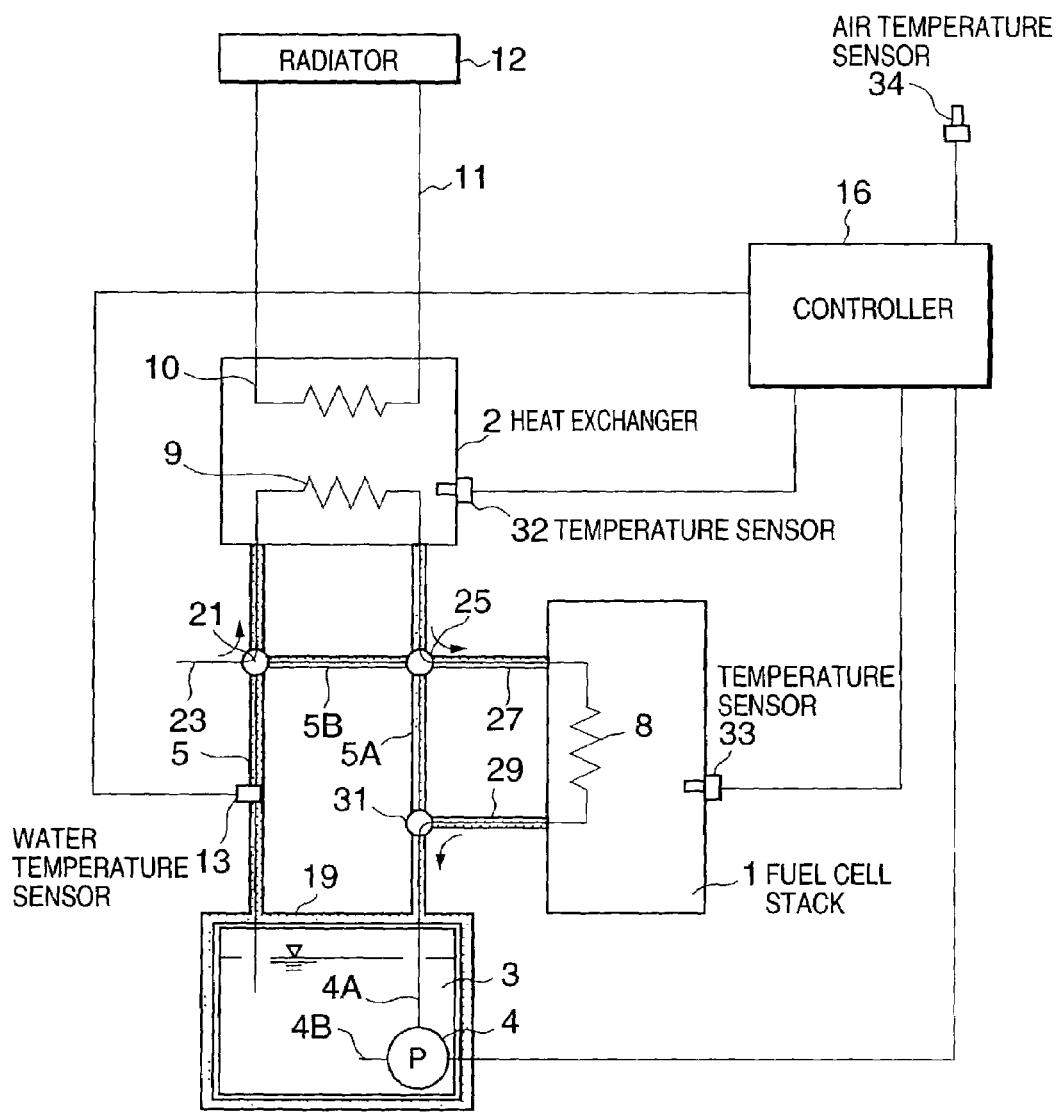
FIG. 5 is a schematic diagram of the water recirculation device according to the second embodiment of this invention showing the flow of water during an evacuation mode.

Referring to FIG. 5, under these conditions, the controller 16 switches the four-way valve 21 to the section connecting the port 23 to the water passage 9, maintains the four-way valve 25 to the section connecting the water passage 9 to the inlet pipe 27 and maintains the three-way valve 31 to the section connecting the outlet pipe 29 to the suction port 4A of the water pump 4. This operating state of the four-way valves 21 and 25 and the three-way valve 31 is termed the evacuation mode.

When the water pump 4 is operating in a positive direction in the evacuation mode, water in the cooling passage 8 of the fuel cell stack 1 and the water passage 9 of the heat exchanger 2 is aspirated into the suction port 4A of the water pump 4 by the suction force of the water pump 4. Outside air is introduced from the port 23 into the water passage 9 and the cooling passage 8. That is to say, this operation is an operation to empty the cooling passage 8 and the water passage 9.

Figure 6:
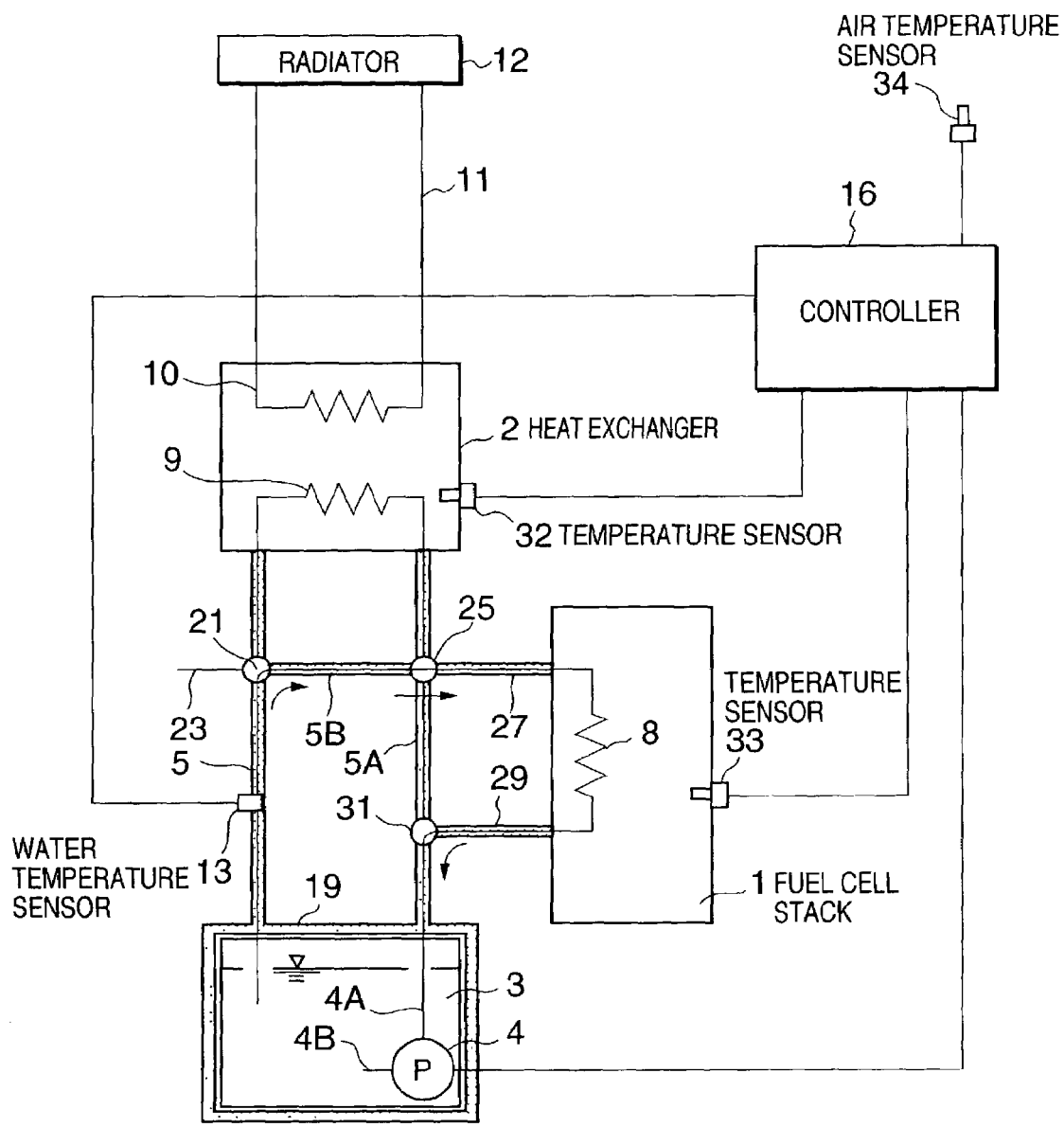
FIG. 6 is a schematic diagram of the water recirculation device according to the second embodiment of this invention showing the flow of water during a stack flow-through mode.

Referring now to FIG. 6, after emptying the water passage 9 and the cooling passage 8, the controller 16 switches the four-way valve 21 to the section which connects the water tank 3 to the bypass passage 5B, switches the four-way valve 25 to the section which connects the bypass passage 5B to the inlet pipe 27 and maintains the three-way valve 31 to the section which connects the outlet pipe 29 to the suction port 4A of the water pump 4. This operating state of the four-way valves 21 and 25 and the three-way valve 31 is termed the stack flow-through mode.

During the stack flow-through mode, the water passage 9 of the heat exchanger 2 is closed in an empty state and thereafter the water passage 9 is not filled with water until the fuel cell stack 2 resumes power generation.

In the stack flow-through mode, water in the water tank 3 is supplied to the cooling water passage 8 in the fuel cell stack 1 through the bypass passage 5 by operating the water pump 4 in the positive direction. The water passing through the cooling water passage 8 is recirculated to the suction port 4A of the water pump 4. Excess heat in the fuel cell stack 1 is absorbed by this water recirculation.

In the stack flow-through mode, when the difference of the temperature Ts of the fuel cell stack 1 and the water temperature Tw becomes smaller than ΔTh, the controller 16 performs a mode change-over to the evacuation mode and operates the water pump 4 in the positive direction as shown in FIG. 5.

Figure 7:
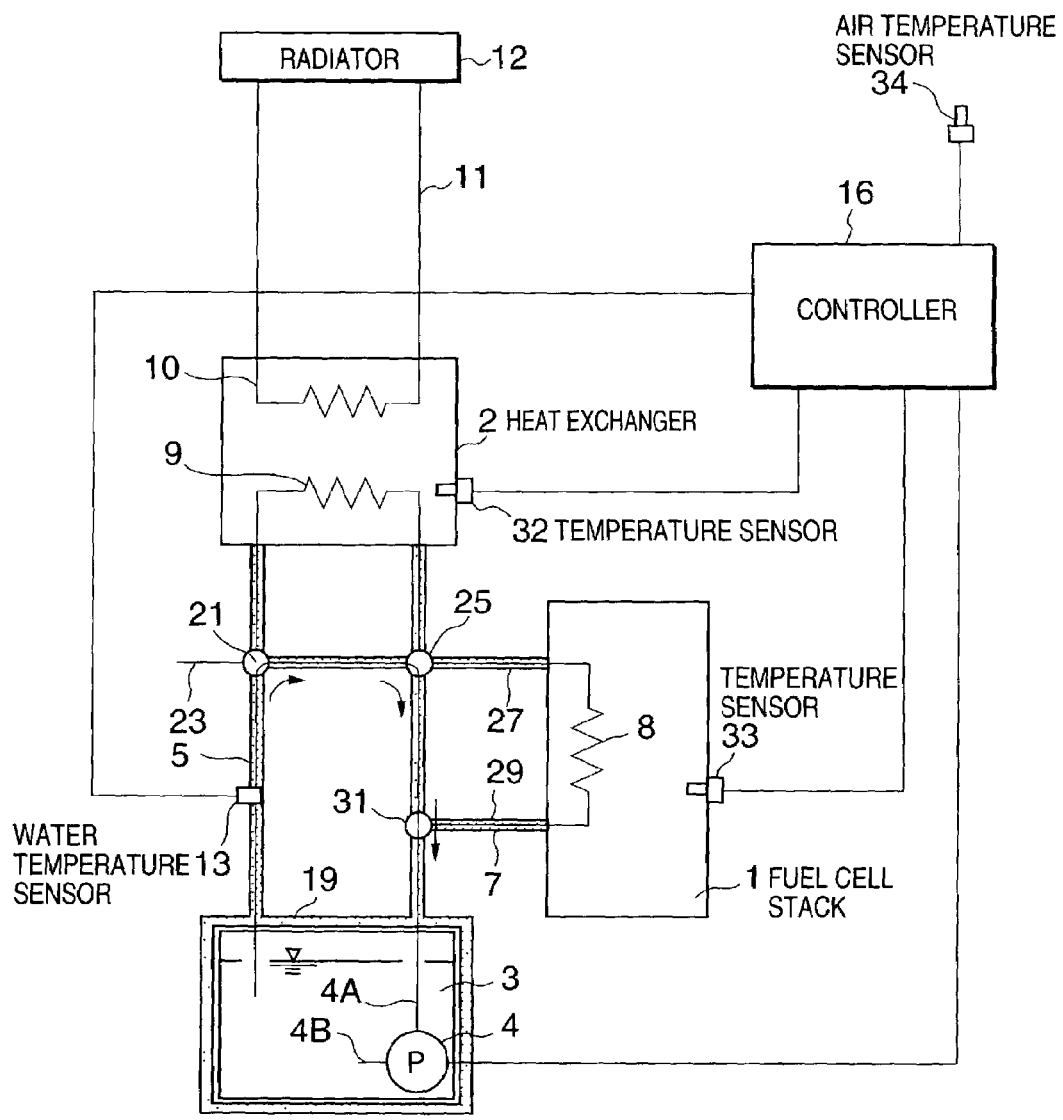
FIG. 7 is a schematic diagram of the water recirculation device according to the second embodiment of this invention showing the flow of water during a bypass mode.

Referring now to FIG. 7, after emptying the cooling passage 8, the controller 16 maintains the four-way valve 21 to the section which connects the water tank 3 to the bypass passage 5B, switches the four-way valve 25 to the section which connects the bypass passage 5B to the bypass passage 5A and switches the three-way valve 31 to the section which connects the bypass passage 5B to the suction port 4A of the water pump 4. This operating state of the four-way valves 21 and 25 and the three-way valve 31 is termed the bypass mode.

In the bypass mode, the controller 16 monitors the water temperature Tw. The same determination is performed on the water temperature Tw as in the first embodiment and when there is no possibility of freezing, the water pump 4 is not operated.

On the other hand, when there is the possibility of freezing, the water pump 4 is operated in the positive direction. As a result, water in the water tank 3 is recirculated through the bypass passages 5A and 5B and flows into the suction port 4A of the water pump 4. Freezing of the water is prevented by the heat generated through operation of the water pump 4 and the water flow in the recirculation passage.

Since in the bypass mode, the recirculation passage for water does not pass through the fuel cell stack 1 or the heat exchanger 2, the distance traveled is shortened. Thus it is possible to make effective use of generated heat resulting from operation of the water pump 4 in order to prevent freezing with little heat lost as a result of water recirculation. In the bypass mode, both the water passage 9 and the cooling water passage 8 are empty. The heat insulation material 19 needs only cover the bypass passages 5A and 5B and the outer piping 5 as shown in the figure. Thus according to this embodiment, it is possible to reduce the amount of heat insulating material 19 used in comparison to the first embodiment.

When the power generation load on the fuel cell stack 1 is low and the temperature of the heat exchanger 2 and the fuel cell stack 1 during power generation stoppage is low, it is not possible to use excess heat of the heat exchanger 2 or the fuel cell stack 1 in order to increase the water temperature after stopping power generation by the fuel cell stack 1.

In this situation, the water passage 9 and the cooling water passage 8 are emptied in the evacuation mode immediately after stopping power generation by the fuel cell stack 1 and thereafter the controller 16 performs a mode change-over to the bypass mode.

When the operation of the fuel cell stack 1 is resumed after the bypass mode, after switching the four-way valves 21 and 25 and the three-way valve 31 to the normal operating mode, the water pump 4 is firstly operated in the reverse direction.

As a result, water discharged to the suction port 4A of the water pump 4 is supplied to the cooling water passage 8 of the fuel cell stack 1 and the water passage 9 of the heat exchanger 2 in order to fill the internal sections of these components. The controller 16 controls the water pump 4 to operate in the positive direction after the cooling water passage 8 and the water passage 9 are filled with water.

Figure 8:
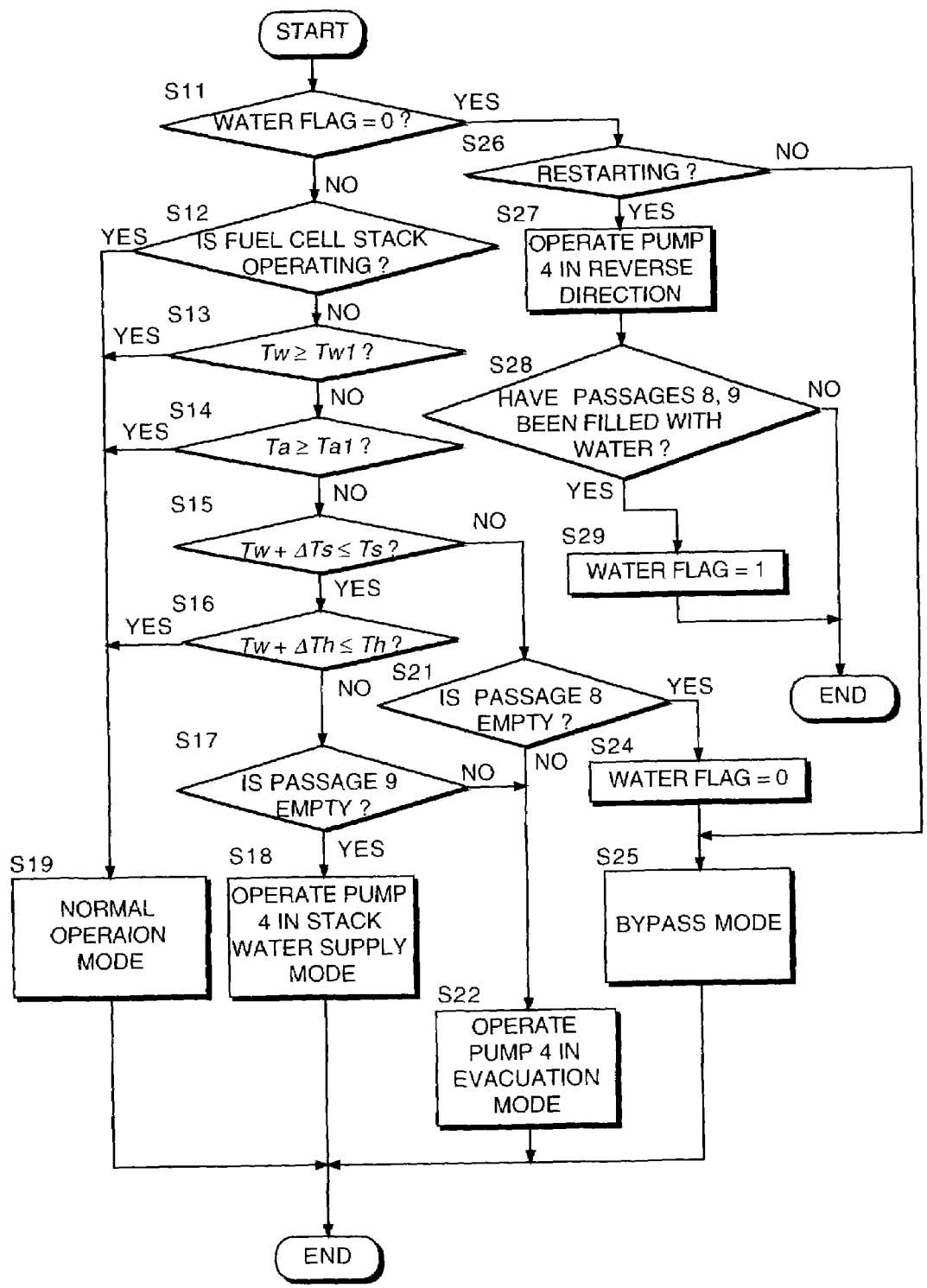
FIG. 8 is a flowchart describing a freezing prevention routine executed by a programmable controller according to the second embodiment of this invention.

Referring to FIG. 8, a freezing prevention routine executed by the controller 16 in order to realize the above control will be described. This routine is executed at an interval of one second irrespective of whether or not the fuel cell stack 1 is operating.

Firstly in a step S 11, the controller 16 determines whether or not the water flag has a value of zero. The water flag is set to one when the water passage 9 of the heat exchanger 2 and the cooling water passage 8 of the fuel cell stack 1 is full of water and is reset to zero when they are empty. The initial value of the water flag is zero.

When the water flag has a value of zero, in a step S26, the controller 16 determines whether or not the fuel cell stack 1 is being restarted. The controller 16 performs this determination by detecting whether or not the electrical accessories required for power generation in the fuel cell stack 1 are in the ON position. The electrical accessories comprise a fuel pump or a compressor for example that are not shown in the drawings but well known as a component of the fuel cell power plant.

When the fuel cell stack 1 has not been restarted, that is to say, when the operation continues to be stopped, in a step S25, control of the water pump 4 is performed in the bypass mode and thereafter the routine is terminated. Control of the water pump 4 in the bypass mode maintains the four-way valves 21 and 25 and the three-way valve 31 to the state as shown in FIG. 7 and maintains the water pump 4 in a stopped state or operates the water pump 4 in a positive direction depending on the water temperature Tw.

In the step S26, when it is determined that the fuel cell stack 1 is being restarted, the controller 16 operates the water pump 4 in the reverse direction in the normal operating mode in a step S27. Then in a step S28, it is determined whether or not the water passage 9 and the cooling water passage 8 are filled with water. For example, this determination can be performed by comparing the continuous operating time of the water pump 4 in the reverse direction with a predetermined time.

In the step S28, when it is determined that the cooling water passage 8 and the water passage 9 have not reached a water-filled state, the controller 16 terminates the routine without performing other control steps. In the step S28, when it is determined that the cooling water passage 8 and the water passage 9 have reached a water-filled state, the controller 16 sets the water flag to a value of one in a step S29 and thereafter terminates the routine.

When it is determined that the water flag does not have a value of zero in the step S11, the controller 16 determines whether or not the fuel cell stack 1 is operating in a step S12. This can be determined on the basis of the above determination of whether or not the electrical accessories required for power generation in the fuel cell stack are in the ON position.

When the fuel cell stack 1 is not operating, the controller 16 compares the water temperature Tw and the rated temperature Tw1 in a step S13. When the water temperature Tw is less than the rated temperature Tw1, the controller 16 compares the outside air temperature Ta with a predetermined temperature Ta1 in a step S14.

The determination in the step S13 and the step S14 is a step for determining the probability of freezing in the water in the fuel cell stack 1, heat exchanger 2 and outer piping 5.

In the step S12 when the fuel cell stack 1 is operating, or in the step S13 when the water temperature Tw is not less than the rated temperature Tw1 or in the step S14 when the outside air temperature Ta is not less than the predetermined temperature Ta1, there is no possibility that freezing will occur in the water in the fuel cell stack 1, heat exchanger 2 and outer piping 5.

When it is determined that there is no possibility of freezing, the controller 16 selects the normal operation mode in a step S19 with respect to the operation positions of the four-way valves 21, 25 and the three-way valve 31. During operation of the fuel cell stack 1, the water pump 4 is operated in the positive direction, and while the fuel cell stack 1 is not operating, the water pump 4 is not operated. Although the process differs depending on whether or not the fuel cell stack 1 is operating or not, these processes are not directly related to the subject of this invention and therefore is represented by the same step S19 as control during the normal operating mode. After the process in the step S19, the controller 16 terminates the routine.

In the step S14, when it is determined that the outside air temperature Ta is less than the predetermined temperature Ta1, the controller 16 determines whether or not the difference of the temperature Ts of the fuel cell stack 1 and the water temperature Tw is greater than $\Delta$Ts in a step S15. An affirmative result for the determination in the step S15 denotes residual excess heat which can be absorbed by the water is existing the fuel cell stack 1.

In this case, the controller 16 determines whether or not the difference of the temperature Th of the heat exchanger 2 and the water temperature Tw is greater than $\Delta$Th in a step S16. An affirmative result for the determination in the step S16 denotes residual excess heat which can be absorbed by the water is existing the heat exchanger 2.

When the determination result in the step S16 is affirmative, the controller 16 performs the same process as the step S19 when the fuel cell stack 1 is operating. That is to say, the water pump 4 is operated in the positive direction during the normal operating mode. In this manner, excess heat in the exchanger 2 and the fuel cell stack 1 can be absorbed by water in the water recirculating therethrough.

When the determination result in the step S16 is not affirmative, although there is residual excess heat in the fuel cell stack 1, there is no residual heat in the heat exchanger 2. In this case, the controller 16 determines whether or not the water passage 9 is empty in a step S17.

When the water passage 9 is not empty in the step S17, the controller 16 operates the water pump 4 in the positive direction in the evacuation mode as shown in FIG. 5 in a step S22. After the process in the step S22, the controller 16 terminates the routine.

The determination in the step S17 can be performed by comparing the continuous operating time of the water pump 4 in the evacuation mode with a predetermined time.

When it is determined that the water passage 9 is empty in the step S17, the controller 16 operates the water pump 4 in the positive direction in the stack flow-through mode as shown in FIG. 6 in a step S18. After the process in the step S18, the controller 16 terminates the routine.

In the step S15, when it is determined that the difference of the temperature Ts of the fuel cell stack 1 and the water temperature Tw is not larger than $\Delta$Ts, that is to say, when there is no residual excess heat which can be absorbed by the water in the fuel cell stack 1, the controller 16 determines whether or not the cooling water passage 8 is empty in a step S21.

When the determination result of the step S21 is negative, the controller 16 performs the process in the step S22 described above and thereafter terminates the routine.

The determination in the step S21 can be performed by comparing the continuous operating time of the water pump 4 in the evacuation mode with a predetermined time.

When the determination result in the step S21 is affirmative, the controller 16 resets the water flag to a value of zero in a step S24. Then in the step S25, the operation of the water pump 4 is controlled based on the water temperature Tw as described above in the bypass mode as shown in FIG. 7. After the process of the step S25, the controller 16 terminates the routine.

The contents of Tokugan 2001-159333, with a filing date of May 28, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A water recirculation device for a fuel cell power plant, the power plant being provided with a fuel cell stack and a heat exchanger, comprising:
   a water tank;
   a recirculation passage connecting the fuel cell stack, the heat exchanger and the water tank, the recirculation passage comprising a water inlet and a water outlet respectively connected to the fuel cell stack in order to recirculate water in the fuel cell stack;
   a water pump recirculating water in the recirculation passage;
   a heater which heats water in the water tank;
   a water temperature sensor detecting a water temperature of the recirculation passage;
   a differential pressure sensor which detects a differential pressure of water between the water inlet and the water outlet; and
   a programmable controller programmed to:
      recirculate water in the recirculation passage by operating the water pump when the water temperature is less than a first predetermined temperature; and
      activate the heater when the water temperature is less than a second predetermined temperature which is lower than the first predetermined temperature and the differential pressure is larger than a predetermined value.

2. The water recirculation device as defined in claim 1, wherein the water recirculation device further comprises a valve which can prevent water in the recirculation passage from recirculating in the heat exchanger and a temperature sensor which detects a temperature of the heat exchanger, and the controller is further programmed to operate the valve to prevent water in the recirculation passage from recirculating in the heat exchanger when the temperature of the heat exchanger is not greater than a predetermined water temperature.

3. The water recirculation device as defined in claim 1, wherein the water recirculation device further comprises a valve which can prevent water in the recirculation passage from recirculating in the fuel cell stack, and a temperature sensor which detects a temperature of the fuel cell stack, and the controller is further programmed to operate the valve to prevent water in the water recirculation passage from recirculating in the fuel cell stack when the temperature of the fuel cell stack is not greater than a predetermined water temperature.

4. The water recirculation device as defined in claim 1, wherein the water recirculation device further comprises a valve which discharges water in the heat exchanger in association with an operation of the water pump by introducing air into the heat exchanger through the recirculation passage.

5. The water recirculation device as defined in claim 1, wherein the water recirculation device further comprises a valve which discharges water in the fuel cell stack in association with an operation of the water pump by introducing air into the fuel cell stack through the water recirculation passage.

6. The water recirculation device as defined in claim 1, wherein the water pump comprises a suction port and a discharge port opening into the water tank, the water pump selectively applying a first operating mode in which the water pump suctions water from the suction port and discharges water into the discharge port and a second operating mode in which the water pump suctions water from the discharge port and discharges water into the suction port, the recirculation passage is configured to recirculate water using a suction force generated at the suction port in the first operating mode, and to fill the fuel cell stack and the heat exchanger with water discharged into the suction port in the second operating mode.

7. A water recirculation device for a fuel cell power plant, the power plant being provided with a fuel cell stack and a heat exchanger, comprising:
   a water tank;
   a recirculation passage connecting the fuel cell stack, the heat exchanger and the water tank, the recirculation passage comprising a water inlet and a water outlet respectively connected to the fuel cell stack in order to recirculate water in the fuel cell stack;
   a water pump recirculating water in the recirculation passage;
   a heater which heats water in the water tank;
   means for detecting a water temperature of the recirculation passage;
   means for detecting a differential pressure of water between the water inlet and the water outlet;
   means for recirculating water in the recirculation passage by operating the water pump when the water temperature is less than a first predetermined temperature; and
   means for activating the heater when the water temperature is less than a second predetermined temperature which is lower than the first predetermined temperature and the differential pressure is larger than a predetermined value.

8. A control method for water recirculation in a fuel cell power plant, the power plant being provided with a fuel cell stack, a heat exchanger, a water tank, a recirculation passage connecting the fuel cell stack, the heat exchanger and the water tank, the recirculation passage comprising a water inlet and a water outlet respectively connected to the fuel cell stack in order to recirculate water in the fuel cell stack, a water pump recirculating water in the recirculation passage, and a heater which heats water in the water tank, the method comprising:
   detecting a water temperature of the recirculation passage;
   detecting a differential pressure of water between the water inlet and the water outlet:
   recirculating water in the recirculation passage by operating the water pump when the water temperature is less than a first predetermined temperature; and
   activating the heater when the water temperature is less than a second predetermined temperature which is lower than the first predetermined temperature and the differential pressure is larger than a predetermined value.

* * * * *